Oct. 7, 1958  W. G. SCOTT  2,854,804
LAWN TRIMMER AND EDGER HAVING ADJUSTABLE WHEELS
Filed Feb. 28, 1956  3 Sheets-Sheet 1

William G. Scott
INVENTOR.

BY
Browning, Simms & Hyer
ATTORNEYS

Oct. 7, 1958　　　　　W. G. SCOTT　　　　　2,854,804
LAWN TRIMMER AND EDGER HAVING ADJUSTABLE WHEELS
Filed Feb. 28, 1956　　　　　　　　　　3 Sheets-Sheet 2

William G. Scott
INVENTOR.

BY Browning, Simms & Hyer
ATTORNEYS

Oct. 7, 1958   W. G. SCOTT   2,854,804
LAWN TRIMMER AND EDGER HAVING ADJUSTABLE WHEELS
Filed Feb. 28, 1956   3 Sheets-Sheet 3
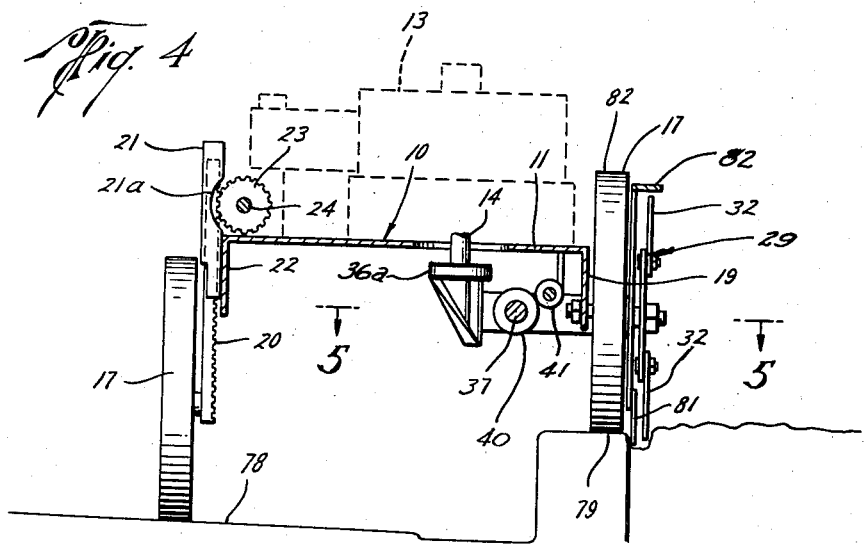
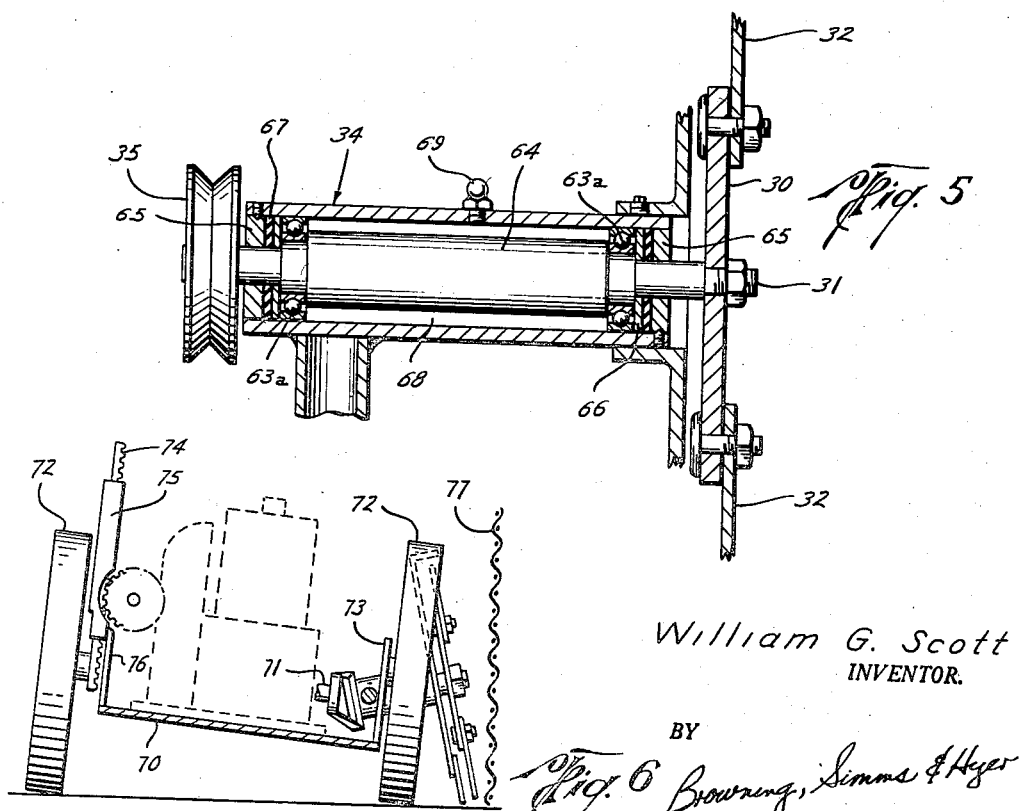
William G. Scott
INVENTOR.
BY
Browning, Simms & Hyer
ATTORNEYS United States Patent Office 2,854,804
Patented Oct. 7, 1958

2,854,804

LAWN TRIMMER AND EDGER HAVING ADJUSTABLE WHEELS

William G. Scott, Houston, Tex.

Application February 28, 1956, Serial No. 568,362

6 Claims. (Cl. 56—25.4)

This invention relates to improvements in a device known in the trade as a combination lawn edger and trimmer.

Devices of this type generally include a motor-driven rotatable cutter blade which is swingable between a substantially vertical position for edging a lawn and a substantially horizontal position for trimming the lawn adjacent the edge. The device is moved over the lawn upon one or more wheels mounted on a support for the motor and is guided in a desired path by means of a handle remote from the support and at a height convenient for the operator.

Prior improvements in this type of device have been directed principally toward making it more versatile, and thus have involved various additional adjustments for positioning the blade. For example, it has been proposed to mount a wheel on both sides of the motor support to make it self-supporting against tipping to one side or the other, and to provide an adjustment for raising or lowering one of the wheels relative to the support to permit the blade adjacent one of the wheels to be pitched to a position for edging along a fence line. Such an adjustment is also useful in providing the device with a small turning radius, and permitting it to be moved over uneven ground. Others of these devices have included one or more rear wheels as well as the aforementioned forward wheels, so as to provide stability against endwise tipping, and another adjustment for raising or lowering the rear wheel relative to the support so as to permit regulation of the elevation of the cutter blade in either the edging or trimming positions.

However, in all of these previous devices, the means for making one or all of such adjustments has been located adjacent the motor support and out of reach of the operator at a position adjacent the handle. As a consequence, it has been a practical necessity, in making such an adjustment, for the operator to first shut-down the motor. Inasmuch as the normal operation of the device may require several adjustments during a single use, this precautionary measure becomes a particularly burdensome and time-consuming task. Furthermore, of course, upon completion of the adjustment, it is necessary to again start the motor.

An object of this invention is to provide an improved combination edger and trimmer in which these adjustments may be made without shutting down the motor, and, more particularly, which may be made by the operator from a position adjacent the frame handle.

Anther object is to provide an improved device of this type in which each adjustment is easily manipulated at such a remote location while at the same time being sturdy of construction.

A further object is to provide in a device of the character defined in the foregoing objects, adjustments which are operable by means of simple hand cranks, and which do not require the complicated mechanisms common to previous adjustments on devices of this type.

Still another object is to provide in a combination edger and trimmer, a cutter blade which is easily removable from the frame.

Other objects, advantages and features of this invention will be apparent to one skilled in the art upon a consideration of the written specification, the attached claims and the annexed drawings.

In the drawings, wherein like reference characters are used throughout to designate like parts:

Fig. 4 is a front elevational view of the edger and trimmer of Figs. 1 to 3, partly in section, and showing one wheel thereof in a lowered position for traversing uneven ground;

Fig. 5 is an enlarged detailed view, taken substantially along broken line 5—5 of Fig. 4, of a housing for the cutter blade; and Fig. 6 is a front elevational view, partly in section, of a modified form of the device of this invention with one wheel thereof in a lowered position and the cutter blade angled outwardly for edging along a fence line.

Figure 1:
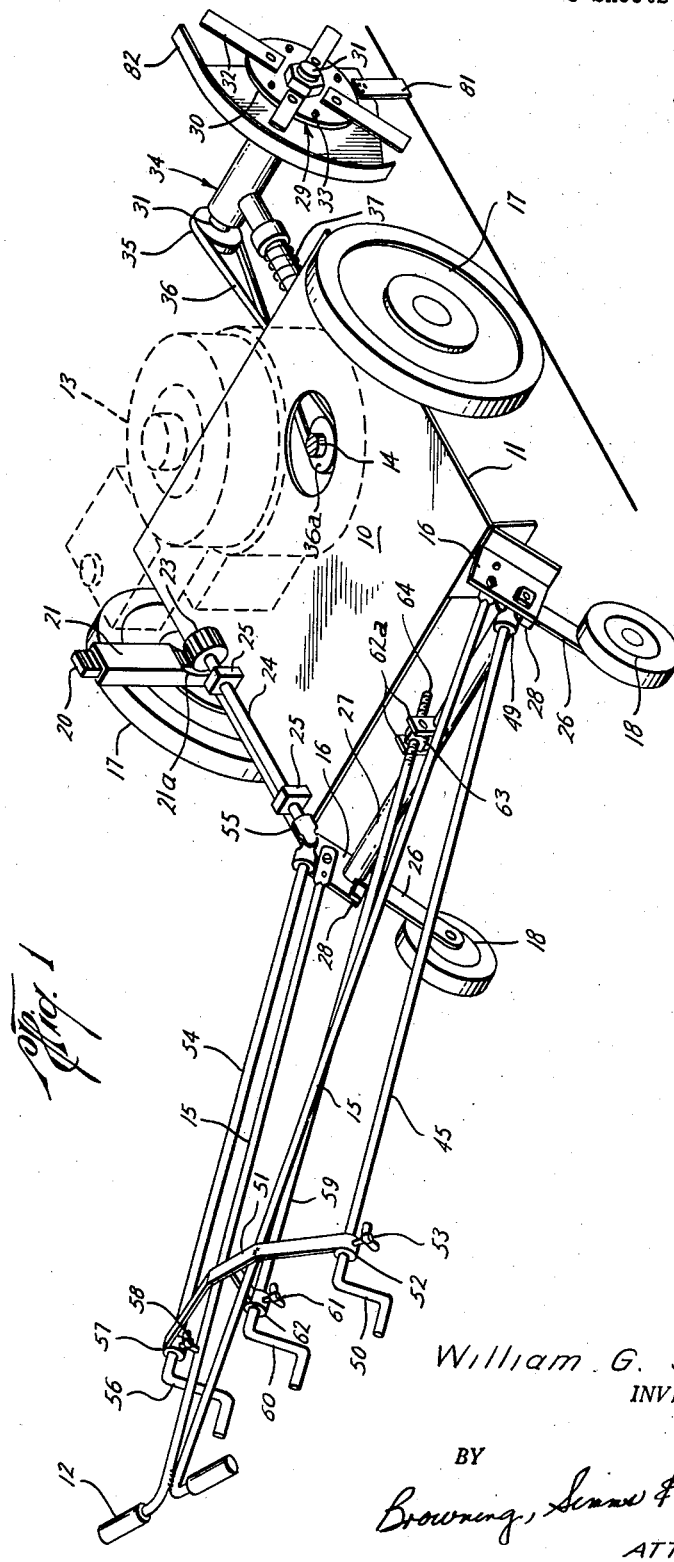
Fig. 1 is a perspective view of a combination lawn edger and trimmer constructed in accordance with the present invention, and with the motor therefor broken away in part to show the connection of its output shaft with a flexible belt, and the cutter blade in edging position.

Referring now particularly to the embodiment of the invention shown in Figs. 1 to 5, it can be seen that the device comprises a frame 10 made up of a platform or motor support 11 and a handle 12 (Fig. 1) at a position remote from the motor support and convenient for manual manipulation. More particularly, there may be supported on the platform 11 a suitable gasoline motor, as indicated diagrammatically in phantom at 13, and having a vertically disposed output shaft 14. The handle 12 is connected to the motor support or platform of the frame by means of rods 15 bolted or otherwise secured to flanges 16 on the rear end of the motor support.

Figure 2:
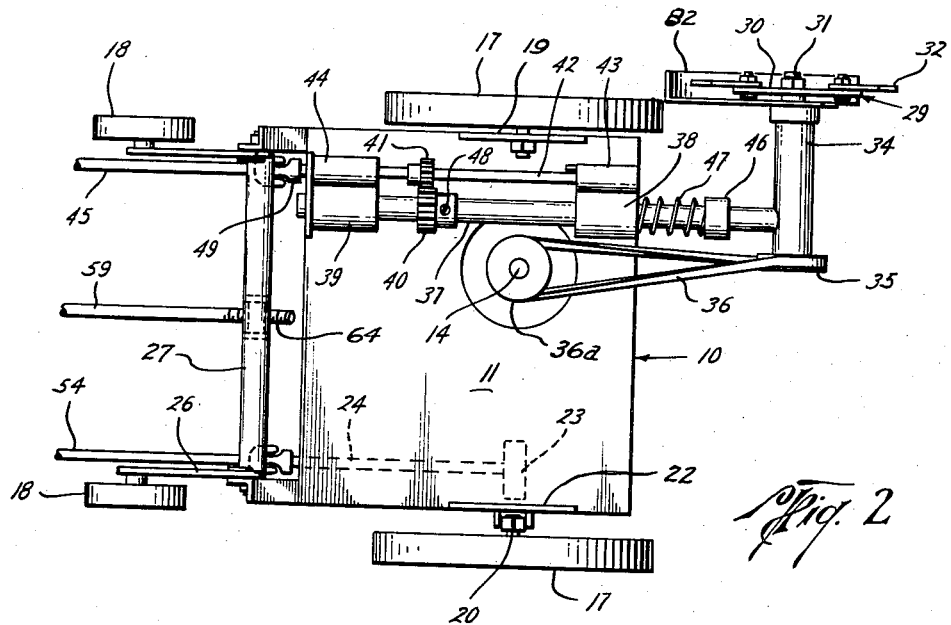
Fig. 2 is a bottom plan view of the edger and trimmer of Fig. 1.

Mounted on each side of the motor support toward the forward end thereof are wheels 17 for use in moving the frame along the earth's surface. Also carried from the motor support are rear wheels 18 which, in addition to providing support for the rear end of the motor support, also permit the elevation of the cutter blade 29 to be adjusted as desired, as will be described hereinafter. As shown in Figs. 2 and 4, one of the forward wheels 17 has its axle supported in a depending bracket 19 at one side of the motor support, while the other of said wheels has its axle supported by a rack 20 which is guided within a vertical member 21 fixed to the outer side of a bracket 22 on the other side of the motor support. This rack 20 has teeth operatively engageable through an opening 21a in the guide member with teeth on a pinion 23 carried on a shaft 24 which is journaled within bearings 25 on the top side of the motor support 11, such that the wheel 17 supported by the rack may be raised and lowered with respect to the support 11, in a manner to be described hereinafter.

The axles of the rear wheels 18 are each secured to legs 26 welded to and extending from tubing 27 rotatably mounted at its opposite ends within flanges 16. By means of an adjustment to be described hereinafter, this mounting of the rear wheels 18 permits them to be raised or lowered with respect to the motor support for selectively changing the elevation of the cutter blade. The amount that the wheels may be raised relative to forward wheel 17 is limited by a stop part 28 secured to the lower rear edge of each of the flanges 16 in a position to engage the leg 26.

The cutter blade is indicated in its entirety by the reference character 29 and includes a central hub 30 fixed to a rotatable shaft or axle 31 and having pivotally mounted thereon circumferentially of its axle a plurality of throw-blades 32 engageable with stop parts 33 on the hub. The axle 31 is rotatably mounted within a cylindrical housing 34, and its end opposite to that to which the cutter blade is attached is provided with a pulley 35 adapted to receive one end of a flexible belt 36 which is extended at its opposite end about a pulley 36a on the lower end of the vertical output shaft 14 of the motor. As can be seen from Fig. 1, for example, this means of power transmission between the cutter blade and the motor permits the blade to be swung between the edging position of Figs. 1, 2 and 4 and the trimming position of Fig. 3.

Figure 3:
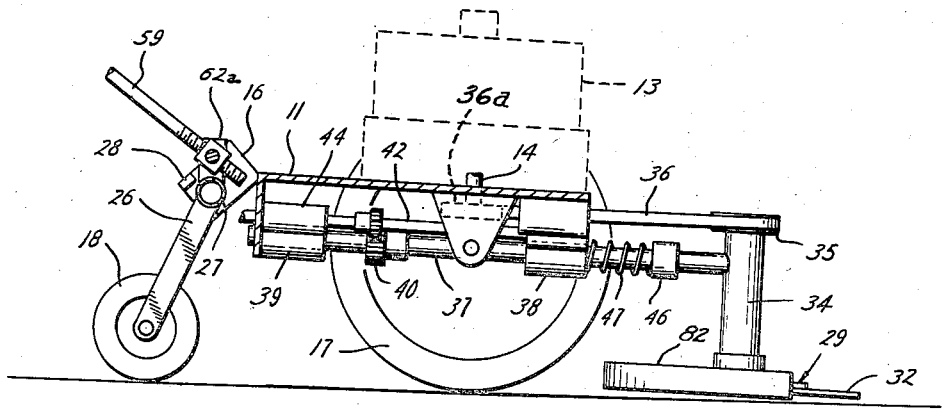
Fig. 3 is a side view of the device, with parts broken away and shown in section, but with the cutter blade in a slightly lowered trimming position.

The cutter blade axle 31 is carried within housing 34 transversely of the direction of travel of the device for rotation in a plane parallel to the direction of travel of the device, and is adapted to be swung between edging and trimming positions by means of a shaft 37 extending longitudinally of the frame and secured to an intermediate portion of the housing. As best shown in Figs. 2 and 3, the shaft 37 is supported by spaced apart journal bearings 38 and 39 on the motor support and is provided with a gear 40 intermediate such bearings for operative engagement with a gear 41 carried by another and substantially parallel extending shaft 42. As can further be seen from Figs. 2 and 3, the other shaft 42 is also supported from spaced apart bearings 43 and 44 secured to the motor support 11 of the frame 10. At its rearward end, the other shaft 42 is connected to an actuator which includes a rotatable rod 45 operable to rotate the shaft 42 and thus the shaft 37 for swinging the cutter blade between edging and trimming positions.

Although the actuator rod 45 and shaft 42 are fixed against movement longitudinally of the frame, as will be understood from the description to follow, the shaft 37 is movable longitudinally as well as rotatable relative to its journal bearings 38 and 39. Thus, the shaft 37 is provided with a shoulder 46 intermediate its forward journal bearing 38 and its connection with housing 34, and a coil spring 47 is disposed between said forward journal bearing and the shoulder so that the shaft and cutter blade are constantly urged in a forward direction. As best shown in Fig. 2, this urging is resisted by the flexible belt 36 of the power transmission means such that, in effect, the belt is maintained taut, during twisting between edging and trimming positions of the blade, by means of the spring 47. Also, the gear 40 is secured to the shaft 37 by means of a set screw 48 which permits the gear to be removed therefrom as the shaft is moved longitudinally forwardly through the journal bearings 38 and 39. Thus, merely upon disconnection of the flexible belt 36 of the power transmitting means and loosening of set screw 48, the cutter blade together with the shaft 37 may be removed from the frame. However, it will be understood that any longitudinal movement of the shaft 37 due to urging of the spring 47 will not be sufficient so as to disengage the gear 40 from the gear 41, the latter gear being secured to its shaft 42.

As best shown in Fig. 2, the rod 45 of the actuator for rotatable shaft 37 is universally connected at 49 at its lower end to the shaft 42, and provided at its upper or rearward end with a crank 50 (see Fig. 1) which is disposed adjacent the handle 12 of the frame. More particularly, a cross bar 51 is secured across the rods 15 connecting the handle and motor support of the frame and is provided with a series of bearings which include bearing 52 for receiving the rod 45 at a point intermediate the crank 50 and universal connection 49. As shown in Fig. 1, this bearing receives a set screw 53 which is adapted to be disposed within an annular groove (not shown) in the rod 45 such that the latter, while rotatable within the bearing 52, is fixed against longitudinal movement with respect to the frame. In this manner, and in combination with the bearings 43 and 44, the gear 41 may be rotated in either direction for rotating the gear 40 in an opposite direction and thus selectively swinging the cutter blade between edging and trimming positions.

It is obvious that the foregoing arrangement accomplishes the objects of the present invention in providing an actuator for use in swinging the cutter blade between its alternate positions, which actuator is easily operable from adjacent the handle of the frame such that the operator need not shut down the motor when such adjustment is being made.

The pinion 23 for raising and lowering the rack 20, from which one of the forward wheels 17 is carried, is rotatable by means of a similar actuator which includes a rod 54 universally connected at 55 at its lower end to the shaft 24 and having a crank 56 at its rearward end adjacent the handle 12. Similarly to the actuator for swinging the cutter blade, the rod 54 is rotatable within a bearing 57 on cross arm 51, but fixed against longitudinal movement with respect to the frame by means of a set screw 58 received through the bearing and adapted to be disposed at its inner end within an annular groove (not shown) in the rod 54. Inasmuch as the rod is fixed in this manner, and further in view of bearings 25 it will be understood that the pinion 23 is at all times maintained in operative engagement with the rack 20.

As previously mentioned, each of the rearward wheels 18 are mounted upon the legs 26 which are in turn secured to the tubing 27 extending transversely of the frame and rotatably mounted at its opposite end within the brackets 16. The actuator for rotating the tubing 27, and thus selectively raising or lowering the wheels 18 with respect to the motor support 11, comprises a rod 59 similar to the rods 45 and 54 in that it is provided at its rearward end with a crank 60 adjacent the handle 12 and fixed against longitudinal movement with respect to the frame by means of a set screw 61 received within a bearing 62 on cross arm 51. The forward end of the rod 59 is connected to the tubing 27 eccentrically of the rotatable axis thereof by means of a mechanism which includes brackets 62a secured to the tubing 27 and rotatably mounting a member 63 adapted to receive the forward threaded end 64 of the rod 59. Thus, it will be understood that the rotatable rod 59 acts as a jackscrew in moving member 63 axially thereof so as to rotate the tubing 27 about its transversely disposed axis. Thus, upon rotation of the crank 60 in a manner to move the member 63 axially away therefrom, the wheels 18 will be caused to rise relative to the motor support 11. Obviously, upon a reverse rotation of the crank 60, the wheels will be lowered with respect to the motor support.

Referring now to Fig. 5, the housing 34 for receiving the cutter blade axle 31 is provided with spaced apart ball bearings which are indicated diagrammatically at 63a at opposite ends of an enlarged diameter portion 64 of the axle or shaft 61. The opposite ends of the housing 34 are closed by covers 65, and washers 66 and rubber seals 67 are tightly held between the ball bearings and covers so as to provide a seal for the annular space 68 between the enlarged diameter portion 64 of the shaft or axle 31 and the inner wall of the thrust bearing. There is also provided a grease fitting 69 through which a suitable lubricant may be injected into the annular space 68.

The embodiment or form of the invention shown in Fig. 6 differs from that above-described principally in that the motor (shown in broken lines) carried upon the support 70 of the frame has a substantially horizontally extending output shaft 71. This disposition of the output shaft 71 enables the motor support 70 to be lowered with respect to the ground surface, so that, as shown, one of the forward wheels is mounted upon an upstanding bracket 73, while the other is supported from a rack 74 within a guide 75 secured to an upstanding flange 76 at the opposite side of the motor support 70. Inasmuch as this embodiment of the invention corresponds in other respects to those previously described in connection with Figs. 1 to 5, a description thereof is not thought necessary. That is, the output shaft 71 is connected by a flexible belt to the shaft for the rotatable cutter in the same manner as described above in connection with the embodiment of Figs. 1 to 5. Similarly, a pinion mounted on the motor support in a suitable manner and engageable with the rack 74 on the wheel 72 is rotated by a crank such as shown at 56 in Fig. 1. Still further, it will be understood that the cutter blade of the embodiment of Fig. 6 may be swung between a substantially horizontal trimming position and a substantially vertical edging position by means of a crank, such as shown at 50 in Fig. 1, on the end of a shaft (as shown in section in Fig. 6 adjacent the flexible belt) connected to the housing for the shaft of the rotatable cutter.

With reference now to the manner in which the improved edger and trimmer of the present invention may be used, Figs. 1 and 2 illustrate the relative positions of the parts of the device when it is used for ordinary edging purposes. Thus, the cutter blade is disposed substantially vertically and in a plane which is substantially parallel to the direction of travel of the frame. If at the time of its use for this purpose, the cutter blade is not disposed in its vertical position, the set screw 53 may be loosened and the crank 50 manipulated by the operator to swing the cutter blade to such position, at which time the screw may be retightened. Furthermore, if it is desired to make either a shallower or deeper cut in the lawn being edged, the operator need only manipulate the crank 60 so as to raise or lower the rear end of support 11 a desired amount. Referring specifically to Fig. 3, it can be seen that this same adjustment of the rearward wheels 18 permits the elevation of the cutter blade to be adjusted in its trimming position as well as in its edging position.

It may be found necessary to edge the lawn along and adjacent to a fence 77, as shown in Fig. 6. Obviously, it would be impossible to reach such a position with the cutter blade in its ordinary edging position. Thus, the cutter blade is swung by the crank 50 to a position in which its lower end is disposed in a direction pointing toward the intersection of the lawn and fence. Furthermore, it is possible to dispose the edge of the cutter blade even closer to this intersection by lowering the forward wheel mounted on the side of the motor support opposite from the cutter blade to tip one side of the support upwardly and, in effect, cause the cutter blade to dip down toward the intersection, as shown in the drawings. A still closer trim may be obtained by manipulating the crank 60 to lower the forward end of the support and thus the elevation of the blade.

As illustrated in Fig. 4, it may also be found desirable or necessary to run the device over uneven ground, such as with one wheel disposed on a street level 78 and the other wheel along curb 79 so that the lawn may be edged adjacent the curb. For this purpose, of course, the crank 56 may be manipulated by the operator without shutting down the motor so as to lower one of the wheels 17 with respect to the motor support 11, whereby the support is kept in a substantially horizontal position and the cutter blade substantially vertical. As shown in Fig. 4, the cutter blade may be provided with a depending guide 81 secured to a guard 82 in a position to engage the curb and prevent the cutter blades 32 from hitting thereagainst.

From the foregoing it will be seen that this invention is one well adapted to attain all of the ends and objects hereinabove set forth, together with the other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A combination lawn edger and trimmer, comprising a frame having a handle and a motor support remote from the handle, a wheel mounted on each side of the motor support for moving the frame over the earth's surface, a cutter blade carried by the motor support for rotation in a plane parallel to the direction of travel of the frame, means operatively associated with said support and blade for swinging the blade between a substantially vertical edging position and a substantially horizontal trimming position, means including an actuator connected to the wheel for moving one wheel vertically with respect to the frame so as to tilt the motor support about an axis parallel to the direction of travel of the frame and supported by the frame for manual operation adjacent the frame handle, and a motor on the motor support for rotating the cutter blade in said edging and trimming positions.

2. A combination lawn edger and trimmer, comprising a frame having a handle and a motor support remote from the handle, a wheel mounted on each side of the motor support for moving the frame over the earth's surface, a cutter blade carried by the motor support for rotation in a plane parallel to the direction of travel of the frame, means for swinging the blade between a substantially vertical edging position and a substantially horizontal trimming position, means for moving one wheel vertically with respect to the frame, a motor on the motor support for rotating the cutter blade in said edging and trimming positions, each of said blade swinging and wheel moving means including an actuator connected to said blade and movable wheel, respectively, and supported by the frame for manual operation adjacent the frame handle.

3. A combination lawn edger and trimmer comprising a frame having a handle and a motor support remote from the handle, a wheel having an axle mounted on each side of the motor support for moving the frame over the earth's surface, a cutter blade carried by the motor support for swinging movement in planes parallel to the direction of travel of the frame between a substantially vertical edging position and a substantially horizontal trimming position, a motor on the motor support for rotating the cutter blade, one of said wheels having a rack secured to and extending radially of its axle, a vertical guide on the motor support to receive the rack, a pinion on the motor support in position to operatively engage the rack for raising and lowering said one wheel so as to tilt the motor support about an axis disposed parallel to the direction of travel of the frame, and an actuator connected to the pinion for rotating the pinion and supported by the frame for manual operation adjacent the frame handle.

4. A combination lawn edger and trimmer of the character defined in claim 3, wherein said actuator includes, a shaft mounted on the motor support and connected to the pinion, and a rod having a universal connection with the shaft, said manually operable part being a crank on the rod for imparting rotation thereto.

5. A combination lawn edger and trimmer, comprising a frame having a handle and a motor support remote from the handle, a wheel mounted on the motor support for moving the frame over the earth's surface, a pair of shafts rotatably carried by the motor support and extending substantially parallel to the path of movement of the frame, a transversely disposed housing secured to the forward end of one of said shafts, a cutter blade having an axle rotatably received within the housing, a motor on the motor support, power transmitting means connecting the motor to the cutter blade axle for rotating the latter, a rod universally connected to the rearward end of the other shaft, gears connecting the shafts intermediate the opposite ends thereof, and a crank on the rod manually operable adjacent the frame handle for rotating the rod to swing the cutter blade between a substantially vertical edging position and a substantially horizontal trimming position.

6. In a combination lawn edger and trimmer having a frame which includes a handle, a motor support remote from the handle, and a wheel mounted on the support for moving the frame over the earth's surface; a shaft received within spaced apart bearings on the motor support for rotation and movement relatively thereto longitudinally of the direction of travel of the frame, a housing connected to the forward end of the shaft and extending transversely thereof, a cutter blade having an axle rotatably mounted in said housing, a motor mounted on the motor support, power transmitting means including a flexible belt connecting the output shaft of the motor with the cutter blade axle, a shoulder on the shaft, spring means disposed between the shoulder and the forward bearing for urging the shaft in a forward direction to maintain the flexible belt in a taut condition, another shaft rotatably carried from the motor support in substantially parallel relation to the first-mentioned shaft, a gear on said last-mentioned shaft operatively engageable with a gear on the first-mentioned shaft intermediate the bearings therefor, and means on the frame for rotating the second-mentioned shaft, the gear on said first-mentioned shaft being removable therefrom such that the cutter blade and first-mentioned shaft are removable from the frame as a unit upon disconnection of the flexible belt.

References Cited in the file of this patent

UNITED STATES PATENTS

| | | |
|---|---|---|
| 315,531 | Morgan et al. | Apr. 14, 1885 |
| 968,564 | Hubbard | Aug. 30, 1910 |
| 2,262,404 | Pavliska | Nov. 11, 1941 |
| 2,263,368 | Sejkora | Nov. 18, 1941 |
| 2,649,678 | Sishc | Aug. 25, 1953 |
| 2,691,264 | Miller | Oct. 12, 1954 |
| 2,709,602 | Orr | May 31, 1955 |
| 2,739,437 | True | Mar. 27, 1956 |